(12) United States Patent
Ino (10) Patent No.: US 10,139,805 B2
(45) Date of Patent: Nov. 27, 2018

(54) LADDER DIAGRAM MONITORING DEVICE CAPABLE OF ADDITIONALLY DISPLAYING OPERATION SITUATION OF CNC IN COMMENT

(71) Applicant: FANUC Corporation, Yamanashi (JP)

(72) Inventor: Yasuyuki Ino, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 257 days.

(21) Appl. No.: 15/267,161

(22) Filed: Sep. 16, 2016

(65) Prior Publication Data

US 2017/0083017 A1    Mar. 23, 2017

(30) Foreign Application Priority Data

Sep. 17, 2015 (JP) ................................. 2015-184310

(51) Int. Cl.
*G05B 19/46* (2006.01)
*G05B 19/406* (2006.01)

(52) U.S. Cl.
CPC .. *G05B 19/406* (2013.01); *G05B 2219/13052* (2013.01); *G05B 2219/33297* (2013.01); *G05B 2219/34273* (2013.01); *G05B 2219/36038* (2013.01)

(58) Field of Classification Search
None
See application file for complete search history.

(56) References Cited

U.S. PATENT DOCUMENTS

| | | | | |
|---|---|---|---|---|
| 4,488,258 A | * | 12/1984 | Struger | G05B 19/056 700/18 |
| 5,410,469 A | * | 4/1995 | Sakamoto | G05B 19/058 700/9 |
| 5,453,933 A | * | 9/1995 | Wright | G05B 19/414 700/181 |
| 5,553,297 A | * | 9/1996 | Yonezawa | G05B 19/052 700/18 |
| 5,784,621 A | * | 7/1998 | Onishi | G05B 19/0426 700/18 |

(Continued)

FOREIGN PATENT DOCUMENTS

| JP | H05250014 A | 9/1993 |
|---|---|---|
| JP | H08123515 A | 5/1996 |

(Continued)

OTHER PUBLICATIONS

Office Action in JP Application No. 2015-184310, dated Oct. 31 2017, 4 pp.

(Continued)

*Primary Examiner* — Isaac T Tecklu
(74) *Attorney, Agent, or Firm* — Hauptman Ham, LLP (57) ABSTRACT

A ladder diagram monitoring device displays an operation situation of a ladder program executed on a programmable controller built in a CNC on a monitor. A comment added to a circuit of the ladder program is provided with a region for displaying information on an operation situation of the CNC, the operation situation of the ladder program is reflected in the region, and display data in which the operation situation of the CNC is displayed is displayed.

3 Claims, 7 Drawing Sheets

(56) References Cited

U.S. PATENT DOCUMENTS

| | | | | |
|---|---|---|---|---|
| 6,556,950 | B1* | 4/2003 | Schwenke | G05B 17/02 700/83 |
| 2003/0177440 | A1* | 9/2003 | Kegoya | G05B 19/042 715/273 |
| 2005/0171624 | A1* | 8/2005 | Nagashima | G05B 19/056 700/23 |
| 2005/0222697 | A1* | 10/2005 | Inoue | G05B 19/0426 700/87 |
| 2006/0074514 | A1* | 4/2006 | Mukai | G05B 19/4069 700/177 |
| 2006/0097956 | A1* | 5/2006 | Ogawa | H04L 67/36 345/2.1 |
| 2006/0179120 | A1* | 8/2006 | Kegoya | G05B 19/042 709/217 |
| 2007/0203676 | A1* | 8/2007 | Jinzenji | G05B 19/052 702/189 |
| 2009/0240349 | A1* | 9/2009 | Tanaka | G05B 19/054 700/19 |
| 2012/0083906 | A1* | 4/2012 | Weatherhead | G05B 23/0267 700/83 |
| 2014/0136911 | A1* | 5/2014 | Kao | G01R 31/31705 714/724 |
| 2014/0304551 | A1* | 10/2014 | Nakai | G06F 11/3692 714/38.1 |
| 2016/0004242 | A1* | 1/2016 | Yamaoka | G05B 19/056 700/87 |
| 2016/0246279 | A1* | 8/2016 | Amano | G05B 19/05 |
| 2016/0256968 | A1* | 9/2016 | Furukawa | B23Q 37/007 |

FOREIGN PATENT DOCUMENTS

| | | |
|---|---|---|
| JP | 2006-99572 A | 4/2006 |
| JP | 2006-107043 A | 4/2006 |
| JP | 2011107810 A | 6/2011 |

OTHER PUBLICATIONS

Decision to Grant a Patent in JP Application No. 2015-184310, dated Mar. 20, 2018, 6pp.

* cited by examiner

EXAMPLE OF CNC INFORMATION TABLE

| KEYWORD | CNC INFORMATION |
|---|---|
| POS1 | CURRENT POSITION OF FIRST AXIS |
| POS2 | CURRENT POSITION OF SECOND AXIS |
| ... | ... |
| SP1 | SPEED OF FIRST AXIS |
| SP2 | SPEED OF SECOND AXIS |
| ... | ... |
| CM | INSTRUCTION CODE IN EXECUTION |
| ONM | NC PROGRAM NUMBER IN EXECUTION |
| UN | DATA UNIT OF AXIS DATA |
| ... | ... |

FIG.6

LADDER DIAGRAM MONITORING DEVICE CAPABLE OF ADDITIONALLY DISPLAYING OPERATION SITUATION OF CNC IN COMMENT

RELATED APPLICATIONS

The present application claims priority to Japanese Patent Application Number 2015-184310,filed Sep. 17, 2015, the disclosure of which is hereby incorporated by reference herein in its entirety.

BACKGROUND OF THE INVENTION

1. Field of the Invention

The present invention relates to a ladder diagram monitoring device, and in particular, relates to a ladder diagram monitoring device on which an operation situation of a ladder program and an operation situation of a CNC can be simultaneously checked.

2. Description of the Related Art

Figure 7:
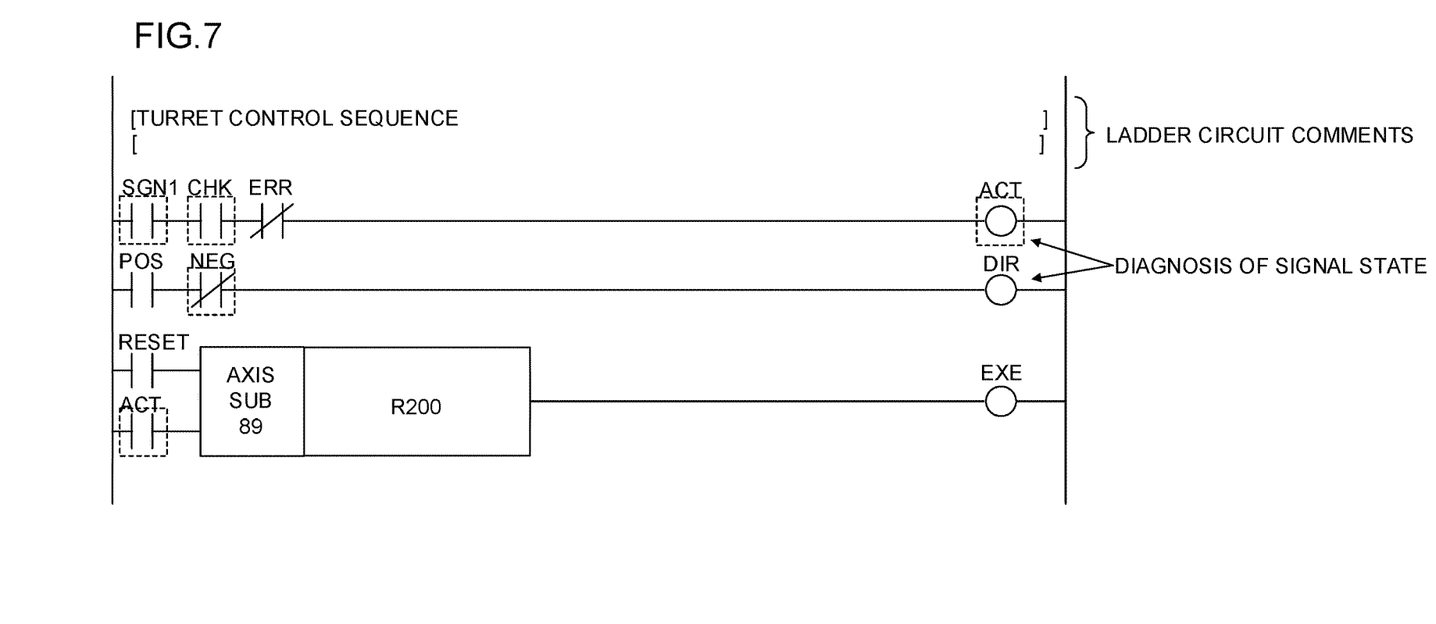
FIG. 7 is a diagram showing a display example of a ladder program including circuit comments.

FIG. 7 shows a display example of a ladder program including circuit comments.

In general, when a ladder program executable by a programmable controller is debugged and diagnosed, icons of contacts and coils are displayed on a ladder diagram monitor display screen and display modes of the icons are changed (in FIG. 7, the contacts and the coils whose signal states are ON are presented as enclosed by dotted frames) to thereby display the signal states of a ladder circuit, and annotations of the ladder circuit as circuit comments.

As a prior art for checking operation of the ladder program, there is known a technique in which states of signals used in a ladder program, related signals designated, and parameter values of functional commands are simultaneously displayed with a ladder diagram monitor display function, for example, in Japanese Patent Laid-Open No. 08-123515. Using the technique, debugging of the ladder program of the programmable controller can be facilitated.

Moreover, there are also known techniques in which in a ladder program constituted of a plurality of ladder circuits, a comment explaining the processing content of a specific ladder circuit among those circuits (circuit comment) is displayed in the vicinity of the ladder circuit, in Japanese Patent Laid-Open No. 05-250014 and Japanese Patent Laid-Open No. 2011-107810. These techniques help a user in understanding the ladder circuits.

In a CNC (numerical controller) including a programmable controller built therein, the CNC and the ladder program cooperate with each other to perform control operations; for example, the ladder program is used to control a numerically controlled axis, or the ladder program controls an external device based on an instruction from an NC program. When such a ladder program which cooperatively works with the CNC is debugged and diagnosed, it is also often required to check related operation situations of the CNC in addition to states of signals and values of parameters which are used in the ladder circuit.

Nevertheless, since a screen on which the operation situations of the CNC can be checked is typically a different screen from a screen for the ladder diagram monitor display function, the screens need to be switched individually to view the information for checking the information on both screens. In this case, the information on both screens cannot be simultaneously checked, and there can also be a case where the debugging and the diagnosis are difficult.

There is in sometime cases provided a function of displaying information on the operation situations of the CNC in addition to the ladder diagram monitor display. However, since information of the CNC needed in debugging and diagnosing is different depending on the ladder circuit, the information of the CNC to be displayed has to be reselected individually for the particular ladder circuit to be debugged and diagnosed.

SUMMARY OF THE INVENTION

An object of the present invention is to provide a ladder diagram monitoring device on which an operation situation of a ladder program and an operation situation of a CNC can be simultaneously checked.

There is provided a ladder diagram monitoring device according to the present invention which displays, on a monitor, an operation situation of a ladder program which is capable of describing comment information added to a circuit executed on a programmable controller built in a CNC. A portion of a character string which is described in a specific format and is included in a circuit comment added into the ladder program is replaced by information on an operation situation and the like of the CNC at that time point (an NC program in execution, a coordinate value and the like) to be displayed. Thereby, the states of signals used in the ladder program and the relevant information of the CNC can be simultaneously viewed. Thus, the operation situation of the ladder program can be efficiently diagnosed.

In the ladder diagram monitoring device according to the present invention, the operation situation of the ladder program is displayed on a monitor, the comment information added to the circuit executed on the programmable controller built in the numerical controller can be described in the ladder program, and the comment information added to the circuit is provided with a region for displaying the information on the operation situation of the numerical controller. Further, the ladder diagram monitoring device includes a ladder program operation situation acquisition unit that acquires information on the operation situation of the ladder program, a CNC operation situation acquisition unit that acquires information on the operation situation of the numerical controller, a display data generation unit that generates display data, which reflects the operation situation of the ladder program and is for displaying the operation situation of the numerical controller in the region in the comment information added to the circuit, based on the ladder program, the information on the operation situation of the ladder program, and the information on the operation situation of the numerical controller, and a display unit that displays the display data.

The region in the comment information added to the circuit may present a keyword corresponding to the information on the operation situation of the numerical controller, and the display data generation unit may be configured to generate the display data by replacing the keyword in the comment information added to the circuit by the information on the operation situation of the numerical controller corresponding to the keyword.

The ladder diagram monitoring device may further include a CNC information list table in which the keyword corresponding to the information on the operation situation of the numerical controller, included in the comment information added to the circuit of the ladder program, is registered, and the CNC operation situation acquisition unit may be configured to acquire the information on the operation situation of the numerical controller corresponding to the keyword registered in the CNC information list table from the numerical controller.

The ladder diagram monitoring device may be configured in the numerical controller.

According to the present invention, when a ladder circuit interlinking with operation of the CNC to, for example, control a numerically controlled axis with a ladder program, is debugged and diagnosed, the states of signals used in the ladder circuit and the operation situations of the CNC in connection with the ladder circuit are displayed side by side on the ladder diagram monitor display. Thereby, since the operation situations of the ladder circuit and the CNC can be simultaneously checked, the ladder program can be efficiently debugged and diagnosed.

Moreover, since the operation situations of the CNC in connection with the ladder circuit explained by the circuit comments can be displayed in the circuit comments in which annotations explaining the processing content of the ladder circuit are displayed, the processing of the relevant ladder circuit can be more understandably explained.

Furthermore, since the information of the CNC displayed in the vicinity can be configured for each ladder circuit, the information of the CNC in accordance with the ladder circuit displayed on the monitor display screen is automatically displayed without calling for or designating the information of the CNC in connection with the ladder circuit individually.

BRIEF DESCRIPTION OF THE DRAWINGS

The aforementioned and other objects and features of the present invention will be more apparent from the following detailed description of embodiments with reference to the appended drawings, in which:

FIG. 3 is a diagram for illustrating the ladder diagram monitoring device according to the present invention being connected to a numerical controller which has a programmable controller built-in;

DETAILED DESCRIPTION OF THE PREFERRED EMBODIMENTS

First, basic operation of the present invention is described.

The present invention allows information display of an operation situation of a CNC to be designated in a circuit comment displayed on a ladder diagram monitor display screen. As a result, information on an operation situation of the CNC related to a ladder circuit regarding the circuit comment can be freely displayed in the circuit comment on the ladder diagram monitor display screen. In this way, the signal state of the ladder circuit and the operation situation of the CNC in connection with the ladder circuit can be simultaneously checked.

For example, when a tool turret axis controlled by the CNC is controlled based on a ladder program, tool exchange is instructed from an NC program executed on the CNC. In response, the ladder program issues an instruction to rotate the tool turret axis controlled by the CNC, and in accordance with this instruction, the tool turret axis operates, so that a tool turret rotates to a desired position.

When such operation of the ladder program is to be checked, information such as the NC program currently in execution, the instruction code to the tool turret axis to rotate the turret, the current position of the tool turret axis, and the rotational speed of the tool turret axis can be viewed along with the operation situation of the ladder circuit itself, so that operation can be efficiently checked.

Therefore, in order to realize the aforementioned ladder diagram monitor display, first, a circuit comment is inserted in the vicinity of the relevant ladder circuit using a ladder program edit function. In the inserted circuit comment, as well as explanation of the ladder circuit, keywords representing various kinds of information of the CNC regarding the display target axis, such as the instruction code to the axis and the current position and the speed of the axis, are designated.

Figure 1:
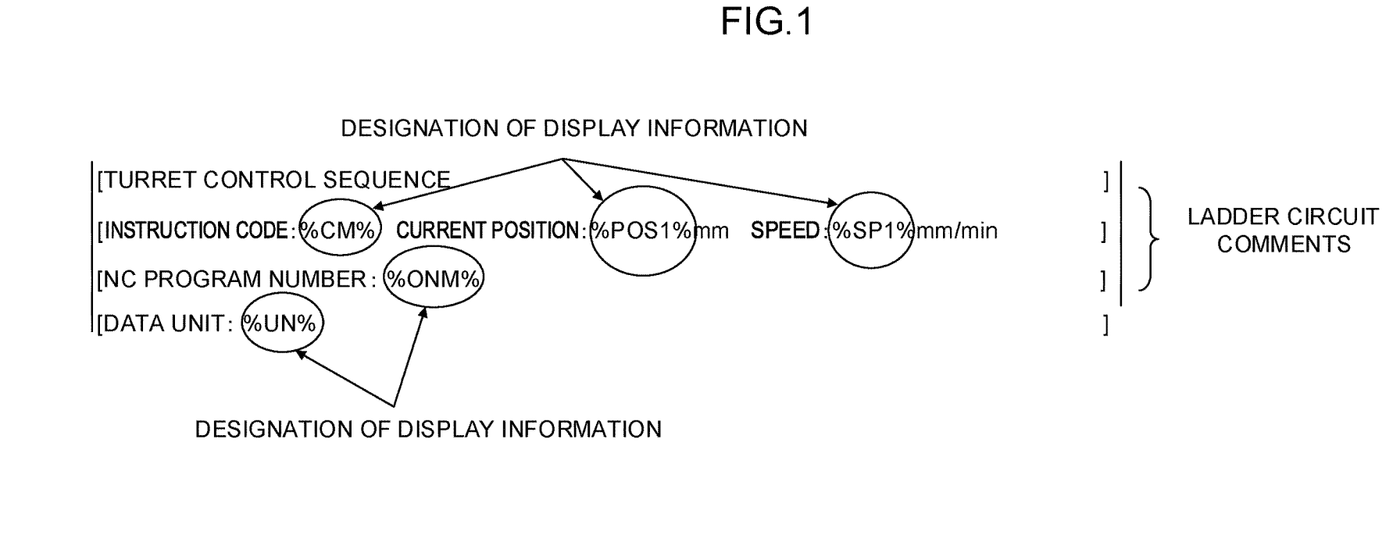
FIG. 1 is a diagram showing an example of circuit comments which are displayed by a ladder diagram monitoring device according to the present invention and include keywords representing information on operation situations of a CNC.

FIG. 1 is a diagram showing an example of circuit comments in which keywords are embedded.

In the example of the circuit comments shown in FIG. 1, each portion enclosed between symbols "%" is a keyword representing each of various kinds of information on operation situations of the CNC. "%POS1%" denotes the current position of the first axis. "%SP1%" denotes the speed of the first axis. "%CM%" denotes the instruction code. "%ONM%" denotes the NC program number in execution. "%UN%" denotes the data unit of the axis data. Notably, the keyword is not necessarily a character string that is enclosed between symbols "%" but any format may be used as long as the keyword can be differentiated from a normal comment.

Next, a ladder program which includes the circuit comments including display designations (keywords) of various kinds of information on the operation situations of the CNC is stored in a programmable controller to be operated. In this stage, a ladder diagram monitoring device is connected to the CNC to enable checking of the operation situations of the ladder program acquired from the programmable controller built in the CNC.

In the ladder diagram monitoring device, the keywords are extracted from the character strings of the circuit comments displayed on the screen, the information on the operation situations of the CNC corresponding to the keywords is acquired from the CNC, and display data in which the portions of the keywords in the character strings of the circuit comments are replaced by the information on the operation situations of the CNC corresponding to the keywords is created and displayed when displaying the circuit comments.

Since the acquisition of the information from the CNC and the display of the circuit comments are properly repeated every operation periods of the ladder diagram monitoring device, the information in the circuit comments which is displayed according to the operation situations of the CNC which are changing every moment is also updated at any time.

Figure 2:
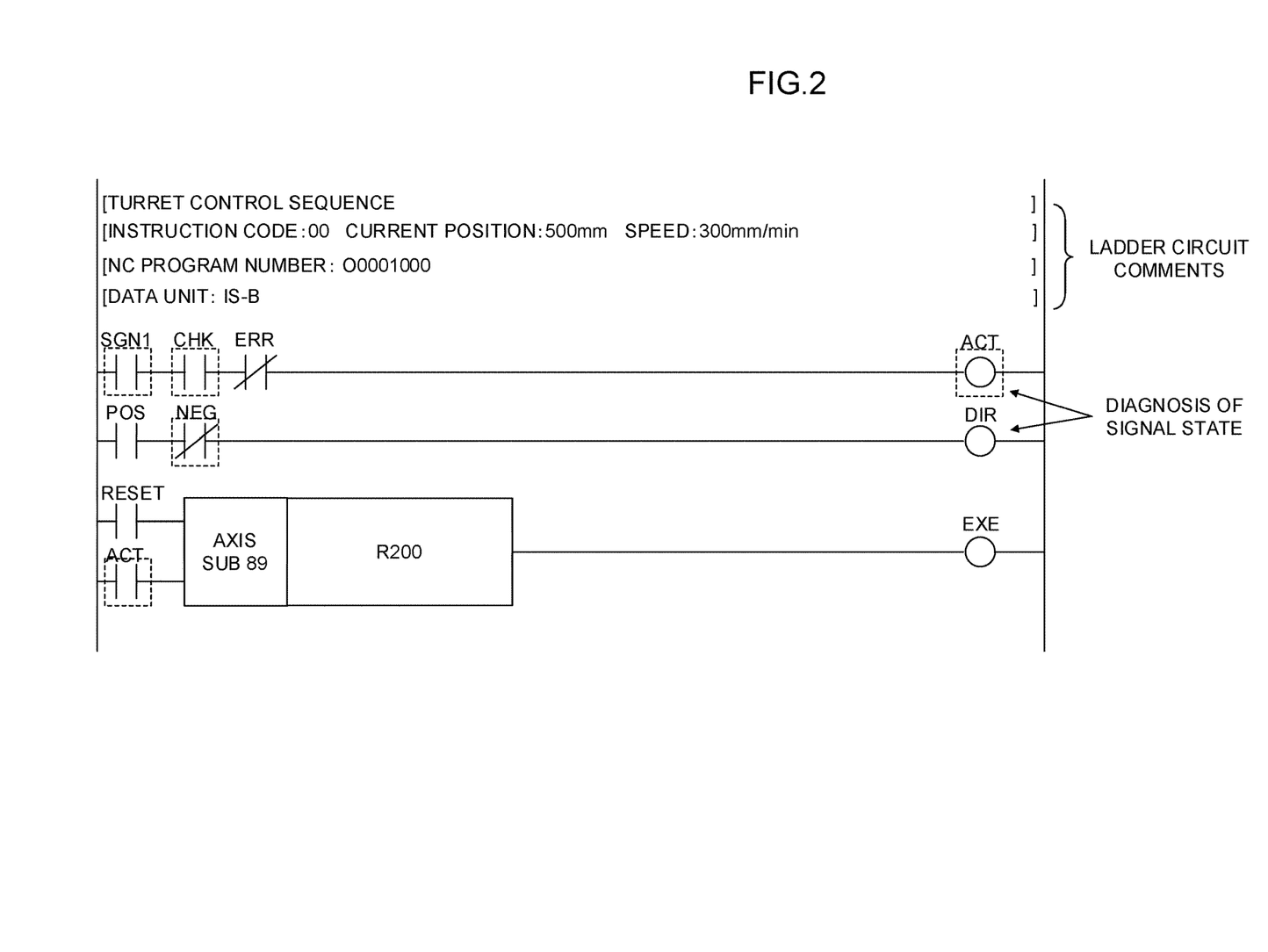
FIG. 2 shows an example of circuit comments which are displayed by the ladder diagram monitoring device according to the present invention, and represents that signal states of a ladder circuit and the operation situations of the CNC in the circuit comments can be simultaneously checked on a display screen.

FIG. 2 shows a display example of the circuit comments by the ladder diagram monitoring device of the present invention.

As a result of the aforementioned display processing, the signal states of the ladder circuits and the operation situations of the CNC in the circuit comments can be simultaneously checked on the display screen of the ladder diagram monitoring device. Moreover, since the information on the operation situations of the CNC can be displayed in the character strings of the circuit comments at arbitrary positions, the processing of the ladder circuit can be easily apprehended as compared with the circuit comments which only have annotations.

Figure 3:
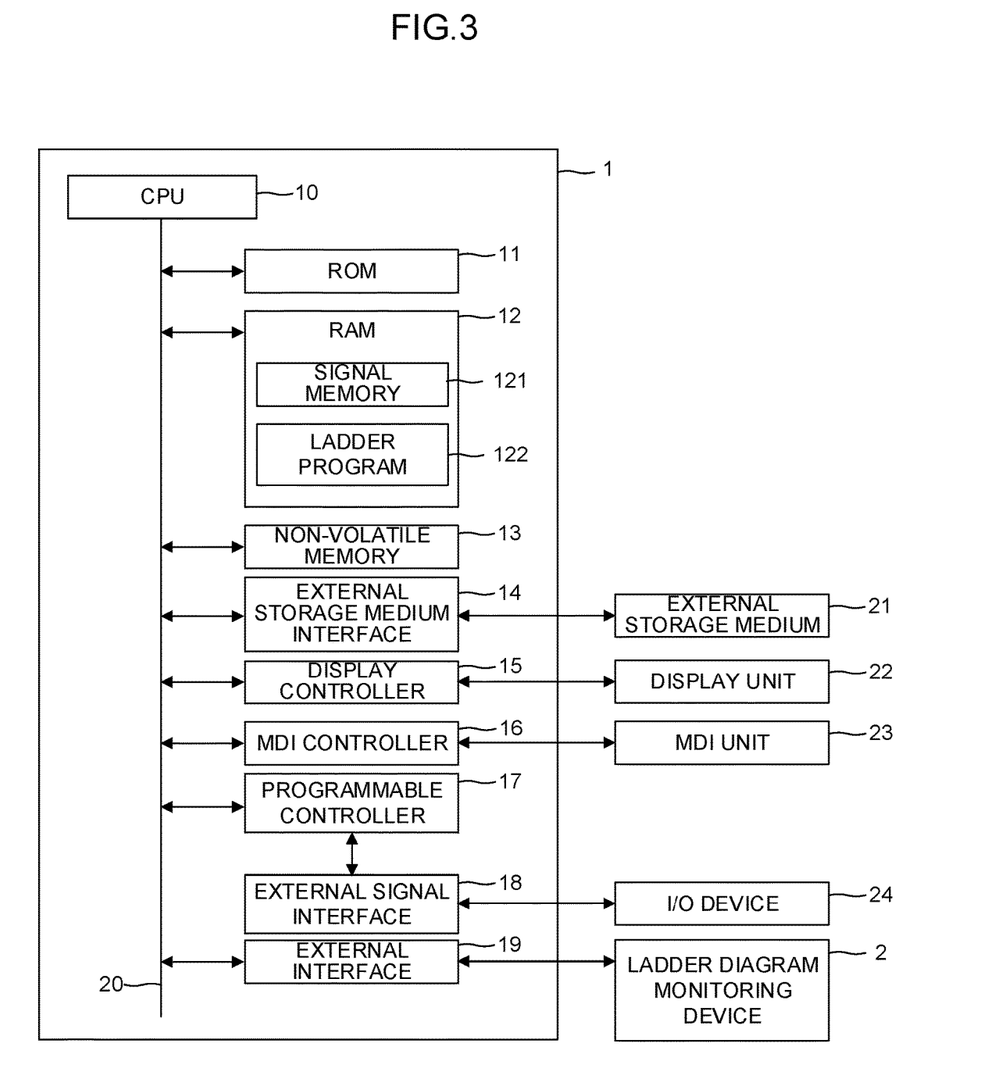

FIG. 3 shows an example in which the ladder diagram monitoring device according to the present invention is connected to the CNC (numerical controller) which has the programmable controller built-in.

A CPU 10 is a processor which is a main part of the whole control of a CNC 1. Upon turning on the power supply of the CNC 1, the CPU 10 reads a system program stored in a ROM 11 via a bus 20, and executes the whole control of the CNC 1 in accordance with the system program. In a RAM 12, temporary calculation data, temporary display data, a signal memory 121 indicating signal states of a machine, a ladder program 122 executed in a programmable controller 17, and the like are stored. In a non-volatile memory 13, operation parameters of the CNC 1, NC programs used for control of the machine, and the like are stored.

An external storage medium interface 14 is an interface for transmitting and receiving data to/from an external storage medium 21, and is constituted, for example, of a USB memory interface and/or a memory card interface. The external storage medium 21 is a storage device that stores data output from the CNC 1, and is constituted, for example, of a USB memory and/or a memory card.

A display controller 15 converts digital data such as current positions, alarm, parameters and image data of axes of a machine (not shown) into an image signal and outputs it to a display unit 22 constituted of a liquid crystal display device and the like. The image signal is displayed on a display screen of the display unit 22. An MDI controller 16 receives data input from an MDI unit 23 and hands it over to the CPU 10.

The programmable controller 17 controls the machine based on a ladder program created in a ladder form. Namely, the programmable controller 17 outputs signals which are output from the CNC 1 based on the ladder program stored in the RAM 12 to the machine and/or a peripheral device (not shown) via an external signal interface 18 and an I/O device 24. Moreover, the programmable controller 17 receives, via the I/O device 24 and the external signal interface 18, input signals such as signals of the machine and manipulation switches of an operation panel (not shown) included in the machine, and signals from a sensor device (not shown) and the peripheral device, performs necessary processing on the input signals based on the ladder program, and hands over the processing result to the CPU 10.

The CPU 10 analyzes movement instructions instructed by the NC program stored in the non-volatile memory 13, the external storage medium 21 or the like to generate instruction data, and drives motors and the like attached to the machine based on the generated instruction data to control the machine. Notably, in FIG. 4, illustration of a spindle control circuit, a spindle amplifier, a manual pulse generator interface and the like is omitted.

An external interface 19 is an interface for transmitting and receiving data to/from an external device such as the ladder diagram monitoring device 2, and is constitute, for example, of the Ethernet (registered trademark) interface, the RS232-C interface, the USB interface and the like.

The ladder diagram monitoring device 2 is a device that displays information on operation situations of the ladder program 122 which information is acquired from the programmable controller 17 built in the CNC 1 via the external interface 19. The ladder diagram monitoring device 2 includes a CPU, a memory, and a display controller, which are not shown, executes ladder diagram monitor display processing mentioned later based on the information on the operation situations of the ladder program 122 which information is acquired from the programmable controller 17 and information on operation situations of the CNC 1, and generates a display screen that can be visually recognized by a user to display it.

Figure 4:
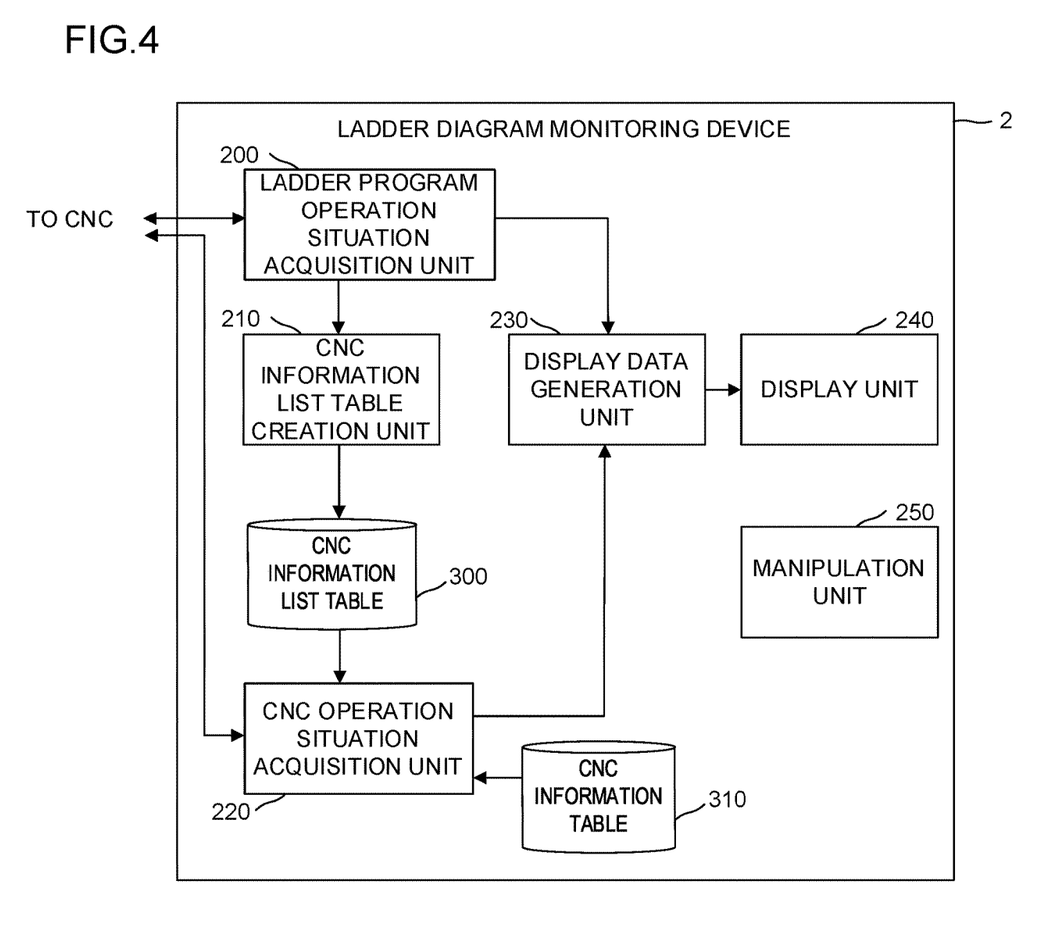
FIG. 4 is a functional block diagram of the ladder diagram monitoring device connected to the numerical controller shown in FIG. 3.

FIG. 4 is a functional block diagram of the ladder diagram monitoring device 2 providing a ladder diagram monitor display function in the present embodiment.

The ladder diagram monitoring device 2 includes a ladder program operation situation acquisition unit 200, a CNC information list table creation unit 210, a CNC operation situation acquisition unit 220, a display data generation unit 230, a display unit 240 and a manipulation unit 250.

The ladder program operation situation acquisition unit 200 acquires a ladder program executed by the programmable controller 17 built in the CNC 1 to which the ladder diagram monitoring device 2 is connected, and information on operation situations of the ladder program via the external interface 19 of the CNC 1, and outputs them to the CNC information list table creation unit 210 and the display data generation unit 230. The acquisition of the operation situations of the ladder program by the ladder program operation situation acquisition unit 200 is performed every operation periods of the ladder diagram monitoring device 2. Moreover, while the acquisition of the ladder program by the ladder program operation situation acquisition unit 200 may be performed every operation periods similarly to the case of the acquisition of the operation situations of the ladder program, acquisition of the ladder program may also be performed only when starting an operation of the ladder diagram monitor display function or when switching the ladder program as an object to be displayed on the basis of manipulation of the manipulation unit 250 and store the acquired ladder program in a memory (not shown) so the stored ladder program may be for display.

When starting an operation of the ladder diagram monitor display function and when switching the ladder program as an object to be displayed on the basis of manipulation of the manipulation unit 250, the CNC information list table creation unit 210 searches the inside of the ladder program acquired by the ladder program operation situation acquisition unit 200, extracts keywords described in circuit comments of the ladder program, and creates a CNC information list table 300 in which the extracted keywords are registered. When the format in which a keyword is enclosed between symbols is employed as mentioned above, for example, the extraction of the keywords is performed by searching for "%" from the top of the character string of a circuit comment, and when "%" is found, further searching for next "%" to extract a character string between the two characters as the keyword. Further, regarding the character next to the second "%" as the top, the processing similar to the above is repeated. Thereby, all the keywords can be extracted from one circuit comment. This only has to be performed on all the circuit comments.

The CNC operation situation acquisition unit 220 refers to a CNC information table 310 based on the keywords registered in the CNC information list table 300, specifies the information on the operation situations of the CNC corresponding to the keywords, acquires the specified information on the operation situations of the CNC from the CNC 1, and outputs data that includes a set of the acquired information on the operation situations of the CNC and the corresponding keywords to the display data generation unit 230. The acquisition of the operation situations of the CNC is performed every operation periods of the ladder diagram monitoring device 2.

Figure 5:
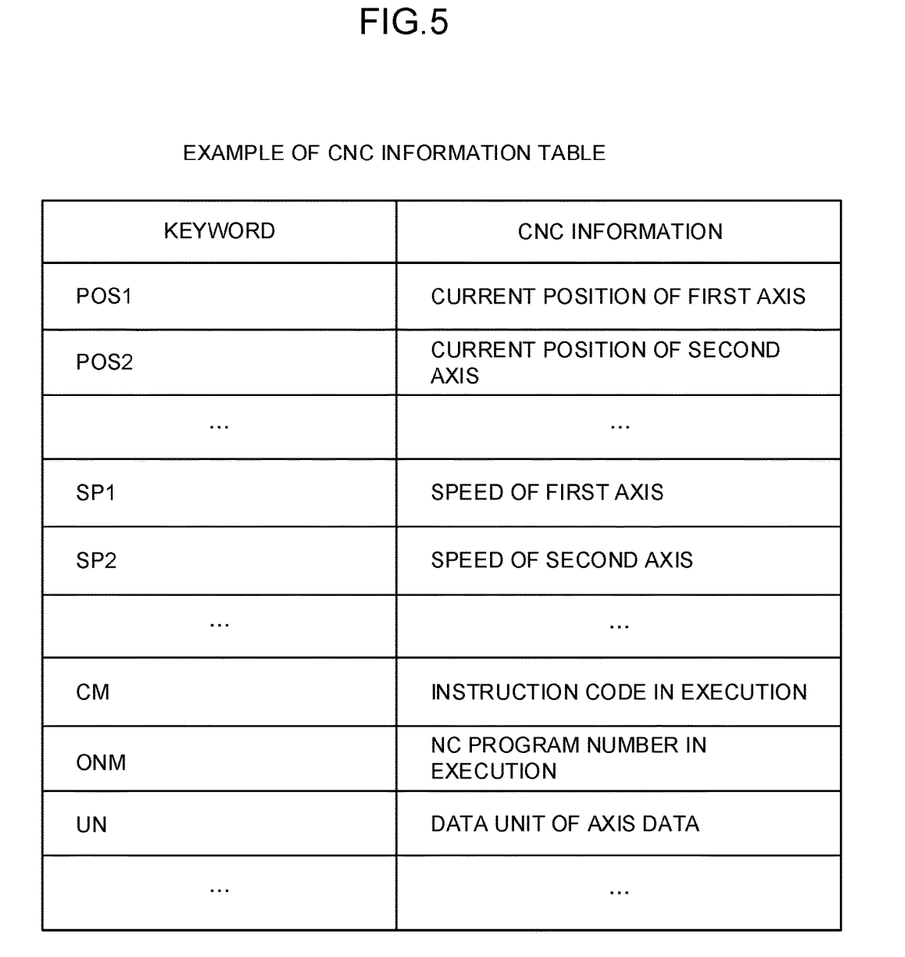
FIG. 5 is a diagram showing an example of a CNC information table included in the ladder diagram monitoring device of FIG. 4.

FIG. 5 shows an example of the CNC information table 310 included in the ladder diagram monitoring device 2.

Correspondence relation between the keywords and the information on the operation situations of the CNC is recorded in the CNC information table 310. In the example of FIG. 5, the information on the operation situation of the CNC "current position of the first axis" is associated with the keyword "POS1 ", and the information on the operation situation of the CNC "instruction code in execution" is associated with the keyword "CM".

The display data generation unit 230 generates display data by changing display modes of contacts, lamps and the like based on the information on the operation situations of the ladder program acquired by the ladder program operation situation acquisition unit 200, and furthermore, replacing the keywords described in the circuit comments of the ladder program by the information on the operation situations of the CNC acquired by the CNC operation situation acquisition unit 220. The generated display data is output to the display unit 240.

Similarly to a typical display method of a ladder diagram, as to changing the display modes of contacts, lamps and the like, a typical display method can be employed, for example, in which display colors of contacts and coils are changed in accordance with ON/OFF of the signal states of those.

In replacement of the character strings, a character string (for example, "%POS1%") regarding a keyword included in the circuit comments of the ladder program duplicated as the display data is replaced by the information on the operation situation of the CNC using a typical replacement algorithm based on the data that includes a set of the keywords output from the CNC operation situation acquisition unit 220 and the information on the operation situations of the CNC.

The display unit 240 is constituted of a display controller for display control and a display device such as a liquid crystal screen, and displays the display data output from the display data generation unit 230 in a mode where an operator can visually recognize it.

The manipulation unit 250 is constituted of input devices such as an operation panel, a keyboard, a mouse and a touch panel, and accepts a manipulation request such as start and end of operation of the ladder diagram monitor display function, switching of a ladder program to be displayed, and scrolling of display, from the operator to instruct operation corresponding to the accepted manipulation request to each of the aforementioned functional means. Notably, in FIG. 5, flows of the instructions or data from the manipulation unit 250 to each of the functional means are omitted.

Figure 6:
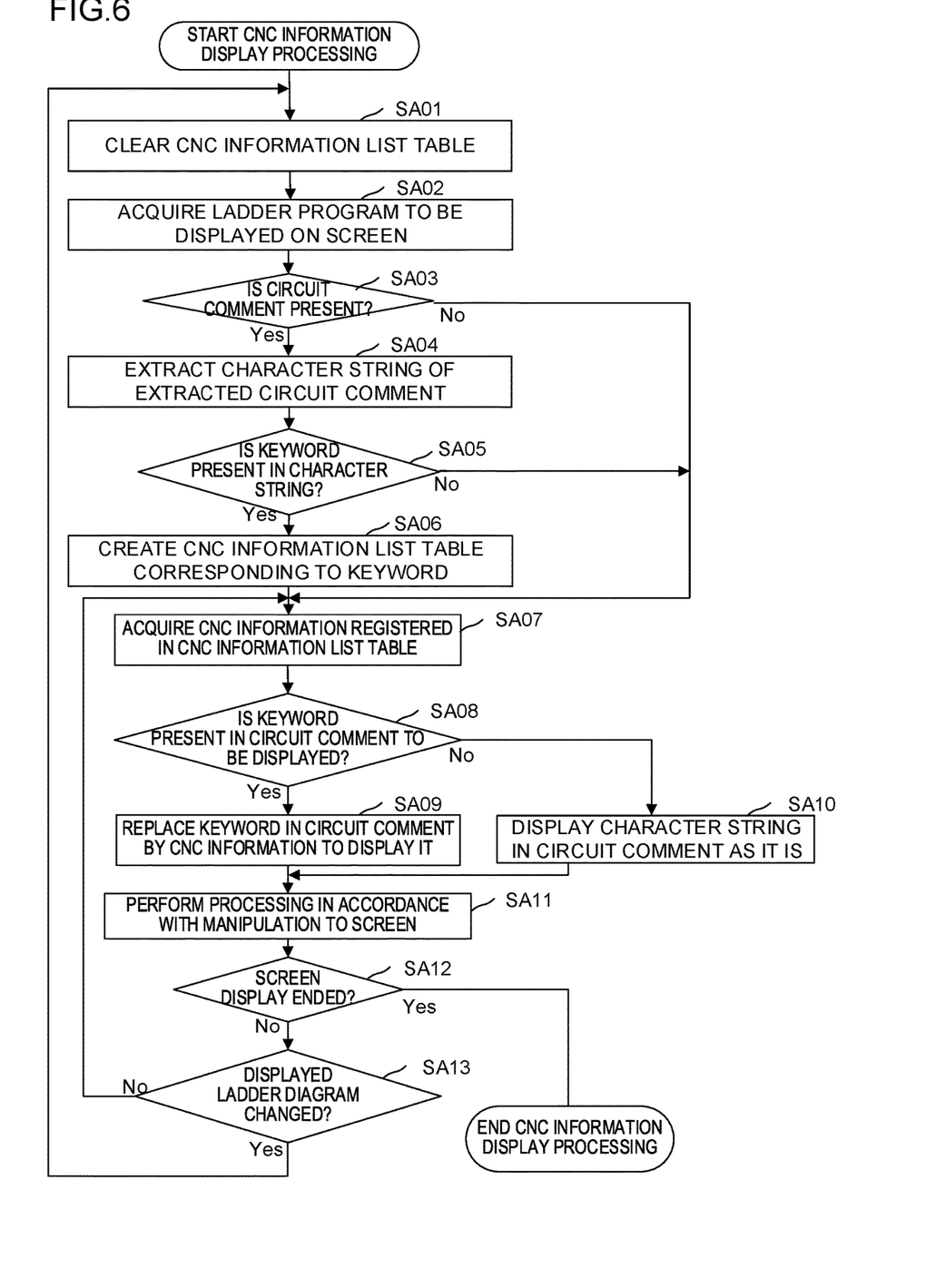
FIG. 6 is a flowchart showing a flow of ladder diagram monitor display processing performed on the ladder diagram monitoring device of FIG. 4.

FIG. 6 is a flowchart showing a flow of the ladder diagram monitor display processing executed on the ladder diagram monitoring device 2. Hereafter, steps thereof are described.

[Step SA01] The CNC information list table creation unit 210 clears the CNC information list table 300 used for storing the CNC information when the ladder diagram monitor display processing is started or when the ladder program which is the display target is switched.

[Step SA02] The ladder program operation situation acquisition unit 200 acquires the ladder program which is the display target from the CNC 1.

[Step SA03] The CNC information list table creation unit 210 extracts each piece of data from the ladder program which is acquired by the ladder program operation situation acquisition unit 200 and is the display target, and checks the presence or absence of a circuit comment in the ladder program. When a circuit comment is present, the process proceeds to step SA04, and when no circuit comment is present, the process proceeds to step SA07.

[Step SA04] The CNC information list table creation unit 210 extracts a character string of the circuit comment from the inside of the ladder program.

[Step SA05] The CNC information list table creation unit 210 determines whether or not a keyword is included in the character string of the circuit comment extracted in step SA04. When a keyword is included, the process proceeds to step SA06, and when no keyword is included, the process proceeds to step SA07.

[Step SA06] The CNC information list table creation unit 210 extracts all the keywords from the character string of the circuit comment extracted in step SA04 to register them in the CNC information list table 300.

[Step SA07] The CNC operation situation acquisition unit 220 acquires each piece of CNC information registered in the CNC information list table 300 from the CNC 1.

[Step SA08] The display data generation unit 230 determines whether or not a keyword is present in the circuit comment of the ladder program to be displayed on the display unit 240. When a keyword is present in the circuit comment, the process proceeds to step SA09, and when no keyword is present in the circuit comment, the process proceeds to step SA10.

[Step SA09] The display data generation unit 230 creates display data in which the keyword in the character string of the circuit comment of the ladder program is replaced by the information on the operation situation of the CNC corresponding to the keyword, and outputs the created display data to the display unit 240.

[Step SA10] The display data generation unit 230 creates display data including the character string of the circuit comment of the ladder program as it is, and outputs the created display data to the display unit 240.

[Step SA11] Manipulation instruction by the manipulation unit 250 is accepted, and the processing is performed in accordance with the manipulation instruction.

[Step SA12] It is determined whether or not manipulation instruction of ending operation of the ladder diagram monitor display function is made. When ending operation of the ladder diagram monitor display function is instructed, the current processing is ended, and otherwise, the process proceeds to step SA13.

[Step SA13] It is determined whether or not manipulation instruction of switching the ladder program to be displayed is made. When the manipulation instruction of switching is made, the process returns to step SA01, and otherwise, the process returns to step SA07.

When a ladder circuit interlinking with operation of the CNC, such as control of a numerically controlled axis with a ladder program, is debugged and diagnosed with the ladder diagram monitoring device of the present invention configured as above, the states of signals used in the ladder circuit, and the operation situations of the CNC in connection with the ladder circuit are displayed side by side on the ladder diagram monitor display. Thereby, since the operation situations of the ladder circuit and the CNC can be simultaneously checked, the ladder program can be efficiently debugged and diagnosed.

Moreover, since in the circuit comments in which annotations explaining the processing content of the ladder circuit are displayed, the operation situations of the CNC which are in connection with the ladder circuit explained by the circuit comments can be displayed, the processing of the relevant ladder circuit can be more understandably explained.

Furthermore, since the information of the CNC displayed in the vicinity can be configured for each ladder circuit, the information of the CNC in accordance with the ladder circuit displayed on the monitor display screen is automatically displayed without calling for or designating the information of the CNC in connection with the ladder circuit individually.

Notably, while the embodiment of the present invention has been described, the present invention is not limited only to the example of the aforementioned embodiment but can be embodied in various aspects based on proper modifications.

For example, while in the aforementioned embodiment, an example is presented in which the CNC 1 and the ladder diagram monitoring device 2 are separately configured and the ladder diagram monitoring device 2 is connected to the CNC 1 to display the operation situations of the ladder program executed on the CNC 1 and the operation situations of the CNC on a monitor, the ladder diagram monitoring device 2 and the CNC 1 may be integrally configured. In this case, among the functional means included in the ladder diagram monitoring device 2, the display unit 240 corresponds to the display controller 15 and the display unit 22 included in the CNC 1, and the manipulation unit 250 corresponds to the MDI controller 16 and the MDI unit 23. The other functional means is realized by the CPU 10 that executes programs for the ladder diagram monitor display function which are stored in the ROM 11 or the like.

Moreover, while in the aforementioned embodiment, the display data is generated by replacing the keywords embedded in the circuit comments by the information on the operation situations of the CNC, modes of display are not limited to this. For example, the information on the operation situations of the CNC corresponding to the keywords may be displayed in the vicinities of the keywords in the circuit comments.

Furthermore, while in the aforementioned embodiment, the configuration is taken in which the CNC information table 310 is provided in the ladder diagram monitoring device 2 and the information on the operation situations of the CNC corresponding to the keywords is specified to be acquired from the CNC 1, there may be taken a configuration in which a configuration corresponding to the CNC information table 310 is provided on the numerical controller side, inquiry is made to the CNC 1 using the keywords, and thereby, the information on the corresponding operation situations of the CNC can be acquired. In this way, a configuration corresponding to the CNC information table 310 is not needed to be provided on the ladder diagram monitoring device 2 side.

The invention claimed is:

1. A ladder diagram monitoring device which displays an operation situation of a ladder program on a monitor and is capable of describing, in the ladder program, comment information added to a circuit executed on a programmable controller built in a numerical controller, Wherein the comment information added to the circuit is provided with a region for displaying information on an operation situation of the numerical controller, and the ladder diagram monitoring device comprises: memory and processor to execute:

a ladder program operation situation acquisition unit that acquires information on the operation situation of the ladder program;

a CNC operation situation acquisition unit that acquires the information on the operation situation of the numerical controller;

a display data generation unit that generates display data, which reflects the operation situation of the ladder program and is for displaying the operation situation of the numerical controller, in the region in the comment information added to the circuit, based on the ladder program, the information on the operation situation of the ladder program, and the information on the operation situation of the numerical controller; and a display unit that displays the display data, wherein the region in the comment information added to the circuit presents a keyword corresponding to the information on the operation situation of the numerical controller, and the display data generation unit is configured to generate the display data by replacing the keyword in the comment information added to the circuit by the information on the operation situation of the numerical controller corresponding to the keyword.

2. The ladder diagram monitoring device according to claim 1, further comprising a CNC information list table in which the keyword corresponding to the information on the operation situation of the numerical controller, included in the comment information added to the circuit of the ladder program, is registered, wherein the CNC operation situation acquisition unit is configured to acquire the information on the operation situation of the numerical controller corresponding to the keyword registered in the CNC information list table from the numerical controller.

3. The ladder diagram monitoring device according to claim 1, wherein the ladder diagram monitoring device is configured in the numerical controller.

* * * * *